United States Patent [19]

Valley

[11] Patent Number: 4,826,030

[45] Date of Patent: May 2, 1989

[54] FLUID DRIPPAGE ABSORPTION AND COLLECTION DEVICES

[76] Inventor: Charles R. Valley, 1309 Redbud Dr., Fairborn, Ohio 45324

[21] Appl. No.: 105,105

[22] Filed: Oct. 5, 1987

[51] Int. Cl.$^4$ .............................................. B32B 1/02
[52] U.S. Cl. ................................... 220/1 C; 206/204; 428/71; 428/316.6
[58] Field of Search ......... 184/106; 220/1 C, DIG. 5, 220/DIG. 6; 206/204; 428/71, 316.6, 319.3, 319.7; 296/38

[56] References Cited

U.S. PATENT DOCUMENTS

| | | | |
|---|---|---|---|
| 2,469,184 | 5/1949 | Thomas | 220/1 C |
| 2,757,478 | 8/1956 | Borland | 45/68.4 |
| 2,986,235 | 5/1961 | Weibert, Jr. | 184/106 |
| 2,990,033 | 6/1961 | Arnold | 184/106 |
| 3,141,522 | 7/1964 | Fitzpatrick | 184/106 |
| 3,195,683 | 7/1965 | Peterson et al. | 184/106 |
| 3,282,381 | 11/1966 | Fitzpatrick | 184/106 |
| 3,284,273 | 11/1966 | Prentice | 161/83 |
| 3,329,231 | 7/1967 | Takenouchi | 180/69.1 |
| 3,333,652 | 8/1967 | Tribuzi | 184/106 |
| 3,565,214 | 1/1971 | Koonce, Sr. | 184/106 |
| 3,565,746 | 2/1971 | Stevens | 428/316.6 |
| 3,679,058 | 7/1972 | Smith | 210/242.4 |
| 3,722,626 | 3/1973 | Stack | 184/106 |
| 3,815,702 | 6/1974 | Paananen | 180/69.1 |
| 4,069,939 | 1/1978 | Bennett | 220/415 |
| 4,114,717 | 9/1978 | Andrews | 180/69.1 |
| 4,484,661 | 11/1984 | Evenson | 184/106 |
| 4,668,555 | 5/1987 | Vekado | 428/71 |
| 4,671,024 | 6/1987 | Schumacher | 52/2 |
| 4,684,562 | 8/1987 | Hartkemeyer | 296/38 |
| 4,695,088 | 9/1987 | Jensen | 296/38 |
| 4,750,775 | 6/1988 | Miller | 184/106 |

Primary Examiner—Leonard E. Smith
Attorney, Agent, or Firm—John R. Flanagan

[57] ABSTRACT

Fluid drippage absorption and collection devices of one-piece constructions each include a slab in the form of a generally block-like body composed of an open-cell, porous, sponge-like, resiliently flexible material, such as unsealed open-cell polyurethane foam, capable of absorbing fluids. In the one-piece construction, the slab body is sealed on all side and bottom surfaces by a coating or layer of closed-cell, non-porous, resiliently flexible material, such as sealed open-cell polyurethane, adhered or molded to such surfaces. Only the top surface of the slab body remains unsealed and porous and thus capable of permitting entry of fluids into the porous interior of the slab body.

18 Claims, 2 Drawing Sheets

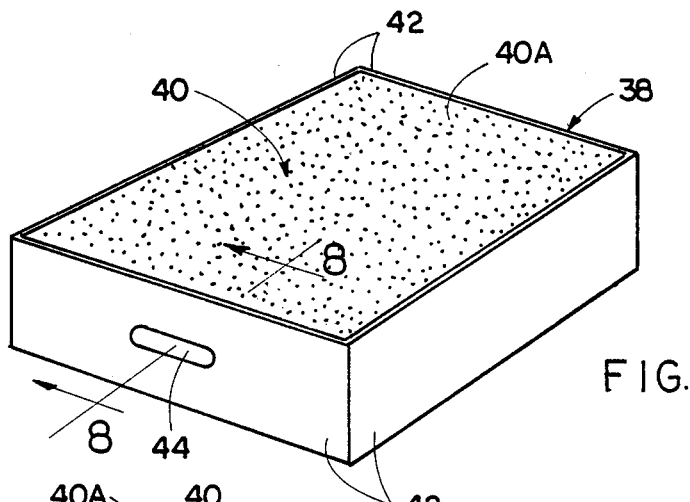
FIG. 5
FIG. 6
FIG. 7
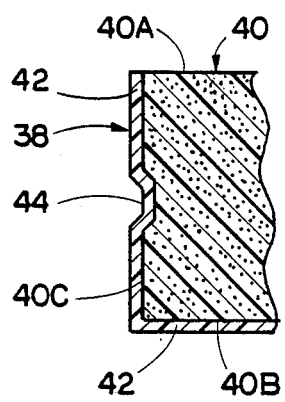
FIG. 8
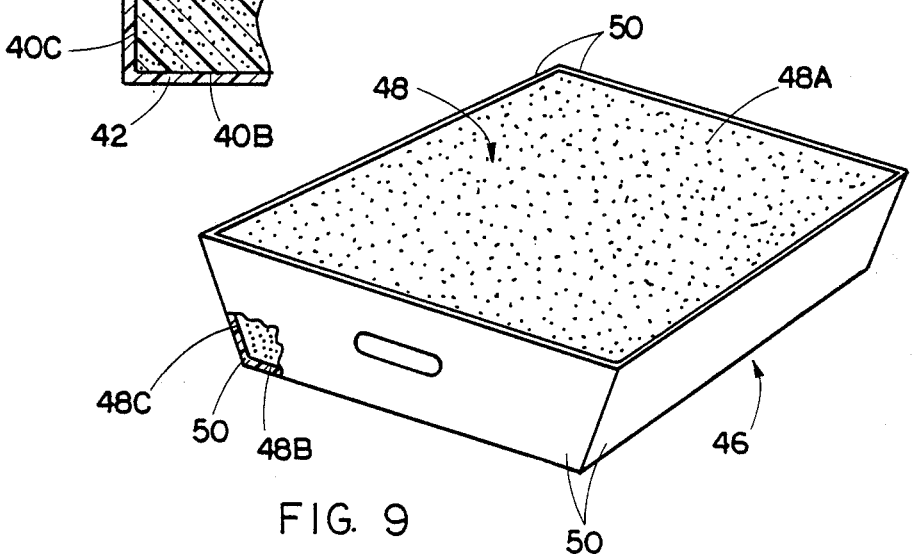
FIG. 9

FLUID DRIPPAGE ABSORPTION AND COLLECTION DEVICES

BACKGROUND OF THE INVENTION

1. Field of the Invention

The present invention generally relates to devices for absorbing and collecting fluid drippage and, more particularly, is concerned with improved one-piece fluid drippage absorption and collection devices.

2. Description of the Prior Art

Leakage of fluids of various kinds, such as oil, grease, anti-freeze and water, from vehicles is a common occurrence. Such fluids typically drip from the vehicle onto the driveway or the garage floor creating a permanent slick condition and discoloration on the surface if some precaution is not taken to catch the fluid drippage. Removal of the slickness and discoloration is practically impossible from most surfaces.

One approach used heretofore to prevent fluid drippage from reaching the garage floor is to place a large piece of cardboard or sheets of old newspapers under the vehicle to catch and soak up the dripping fluid. However, these materials are subject to being blown about by gusts of wind and movement of the vehicle. Also, once they are soiled by accumulation of only a small amount of fluid drippage on them, the materials must be gathered up, folded, discarded and replaced by a fresh supply. Typically, the fluid soaks through the materials and coats the floor underneath producing a slick surface and discoloration on the floor before the materials are replaced.

Another approach practiced heretofore is to use a collection pan or tray or an absorption mat or pad to catch the fluid drippage. Many devices having different constructions for accomplishing this task appear in the prior patent art. Representative of the prior art are the devices disclosed in U.S. Pat. Nos. to Weibert, Jr. (2,986,235), Arnold (2,990,033), Peterson et al (3,195,683), Fitzpatrick (3,282,381), Prentice (3,284,273), Takenouchi (3,329,231), Koonce, Sr. (3,565,214), Stack (3,722,626), Paananen (3,815,702), Evenson (4,484,661) and Schumacher (4,671,024). Many of these prior art devices probably operate reasonably well and generally achieve their objectives under the limited range of operating conditions for which they were designed. However, none appear to represent the optimum solution to the problem of catching and collecting fluid drippage to prevent it from contacting the portion of a floor or driveway under a vehicle.

Consequently, a long-felt need remains for a simple and effective way to collect and absorb fluid drippage so as to avoid the safety hazard of slick surfaces and the unsightly and irremovable stains on garage floor and driveway surfaces.

SUMMARY OF THE INVENTION

The present invention provides improved fluid drippage absorption and collection devices designed to satisfy the aforementioned needs. Several embodiments of improved devices constructed in accordance with the principles of the present invention are disclosed herein. All embodiments have a one-piece construction.

In each embodiment having the one-piece construction, each of the devices is a slab in the form of a generally block-like body composed of an open-cell, porous, sponge-like, resiliently flexible material, such as unsealed open-cell polyurethane foam or an equivalent, capable of absorbing fluids. The slab body is sealed on all side and bottom surfaces by a coating or layer of closed-cell, non-porous, resiliently flexible material, such as sealed open-cell polyurethane or an equivalent, adhered to such surfaces. Only the top surface of the slab body remains unsealed and porous and thus capable of permitting entry of fluids into the porous interior of the slab body.

Once appropriately placed underneath a vehicle, the slab itself thus serves as a receptacle capable of receiving and containing drippage and of preventing it from producing a slick surface and soiling the floor surface of the facility where the vehicle is stored. The slab can have any of a variety of configurations, for example rectangular, circular or oblong, to name a few. Also, the slab can be tapered or inclined outwardly and downwardly at its sides to aid in resisting strong gusts of wind which might otherwise dislodge it from its desired position under a vehicle.

For those applications where devices of the one-piece construction are intended to collect and hold a substantial amount of fluid, such as where the devices are used to collect oil drained during service of the vehicle instead of just collecting drippage, the layer of sealed and non-porous material adhered on all side and bottom surfaces of the slab body has greater thickness than in the drippage application. Also, indentations can be molded into the sealed, non-porous layer at a pair of the opposite sides of the slab body to provide fingerholds to facilitate lifting and carrying of the device.

It is readily apparent that the one-piece embodiments of the devices of the present invention are exceedingly simple and economical in their respective constructions. Also, it is equally apparent that they will be highly effective in eliminating contact of dripping or draining fluid with the floor or driveway and will enhance one's ability to properly dispose of the waste fluid.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a perspective view of a third embodiment of a fluid drippage absorption and collection device having the one-piece construction.

FIG. 6 is a perspective view of a fourth embodiment of a fluid drippage absorption and collection device having the one-piece construction.

FIG. 7 is a perspective view of a fifth embodiment of a fluid drippage absorption and collection device having the one-piece construction.

FIG. 8 is an enlarged fragmentary sectional view of the device of FIG. 7 taken along line 8—8 therein.

FIG. 9 is a perspective view of a sixth embodiment of a fluid drippage absorption and collection device having the one-piece construction.

DETAILED DESCRIPTION OF THE INVENTION

Figure 1:
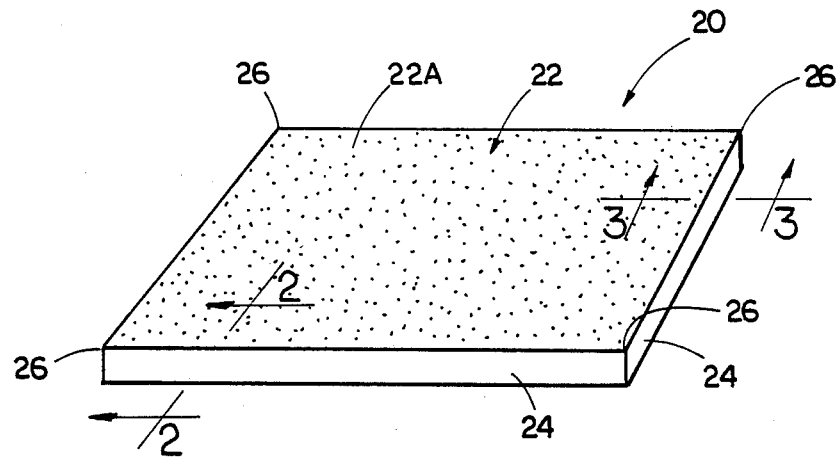
FIG. 1 is a perspective view of a first embodiment of a fluid drippage absorption and collection device having a one-piece construction.
Figure 2:
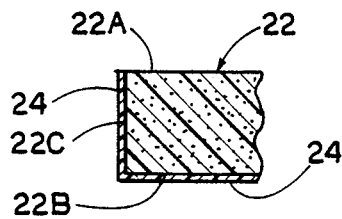
FIG. 2 is an enlarged fragmentary sectional view of the device of FIG. 1 taken along line 2—2 therein.
Figure 3:
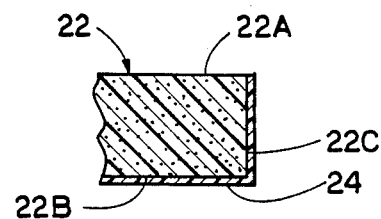
FIG. 3 is another enlarged fragmentary sectional view of the device of FIG. 1 taken along 3—3 therein.

Referring now to the drawings, and particularly to FIGS. 1-3, there is shown a fluid drippage absorption and collection device, generally designated by the numeral 20, which constitutes a first embodiment of devices having a one-piece constructional form in accordance with the principles of the present invention.

Basically, the fluid drippage absorption and collection device 20 is a slab 20 having a one-piece construction in the form of a generally block-like body 22 and a partial outer film, coating or layer 24 permanently molded or adhered to the body 22. The slab body 22 is rectangular in configuration and composed of a porous, sponge-like, resiliently flexible material capable of absorbing fluids. It has a top surface 22A, a bottom surface 22B and an endless side surface. As is clearly depicted in FIGS. 1-3, the top and bottom surfaces extend in planes which are generally parallel to one another. In the first embodiment, the endless side surface of the body 22 is in the form of four side surfaces 22C, interconnected at right angle corners 26, which extend between and interconnect the top and bottom surfaces 22A, 22B. The porous, sponge-like material of the slab body 22 is preferably unsealed open-cell polyurethane foam; however, other equivalent materials can also be advantageously used.

The slab layer 24 partially covering the slab body 22 is composed of a non-porous, resiliently flexible material permanently and sealably adhered to the bottom and side surfaces 22B, 22C of the slab body 22. Thus, only the top surface 22A of the slab body 22 remains unsealed and porous and thus capable of permitting entry of fluids into the porous interior of the slab body 22 between the surfaces 22A-C thereof. In other words, the slab body 22 is sealed on its bottom and sides surfaces 22B, 22C by the slab coating or layer 24. Therefore, the interior of the slab body 22 bounded by the sealed bottom and side surfaces 22B, 22C thereof, in effect, constitutes a receptacle for containing within the slab body interior the fluids entering the slab body 22 through its unsealed top surface 22A. The non-porous, resiliently flexible material of the slab layer 24 is preferably sealed open-cell polyurethane; however, other equivalent materials can also be advantageously used.

Figure 4:
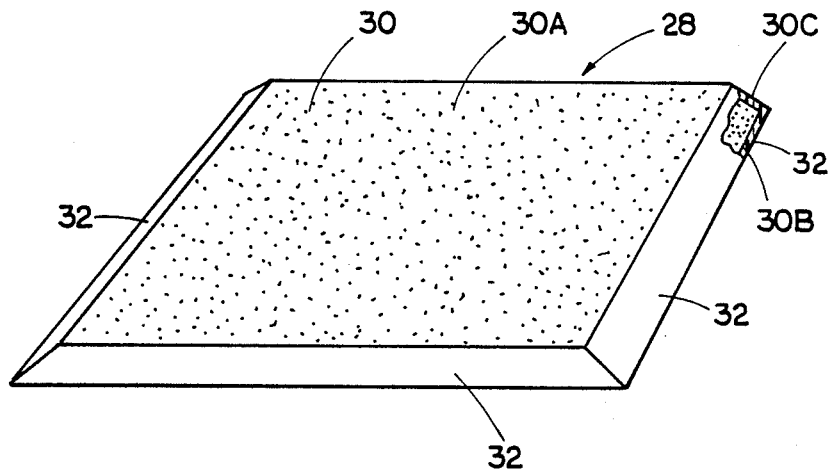
FIG. 4 is a perspective view of a second embodiment of a fluid drippage absorption and collection device having the one-piece construction.

Once appropriately placed underneath a vehicle, the slab 20 itself thus serves as a receptacle capable of receiving and containing drippage and of preventing it from soiling the floor surface of the facility where the vehicle is stored. Also, to increase its wind resistance, the device of the present invention can be provided in a slightly modified, second embodiment as exemplified by the slab 28 ahsown in FIG. 4. The slab body 30 and layer 32 of the second embodiment are identical to the slab body 22 and layer 24 of the first embodiment except that the slab body 30 has a top surface 30A smaller in area than its bottom surface 30B. Thus, the side surfaces 30C of the slab body 30 are tapered or inclined outwardly and downwardly from the top surface 30A to the bottom surface 30B to aid in resisting strong gusts of wind which might otherwise dislodge it from its desired position under a vehicle.

As exemplified by third and fourth embodiments of the device of the present invention in the first group thereof being shown in FIGS. 5 and 6, the device can have any of a variety of configurations other than the rectangular configuration in FIG. 1. The slab 34 in FIG. 5 is circular in configuration, whereas the slab 36 in FIG. 6 is oblong in configuration.

Preferably, the body 22 and partial outer layer 24 of the slab 20 of the first embodiment, as well as of the second through fourth embodiments, are molded together in an suitable conventional heat mold or polyurethane process to provide the one-piece construction. One approach to fabricating the slab 20 is to form a "bun" of the porous material twice the desired thickness of the finished slab and completely covered about its exterior with the non-porous material of the layer 24. Then, the bun is sliced in half along a plane parallel to the top and bottom surfaces of the bun to produce two slabs. The surface of each bun half or slab produced by slicing the bun then becomes the porous top surface of the respective slab.

FIGS. 7-9 illustrate fifth and sixth embodiments of the device of the present invention being designed for those applications where it is intended to collect and hold a substantial volume of fluid, such as where the device is used to collect oil drained during service of a vehicle instead of just collecting drippage. Referring to the fifth embodiment of the device in FIGS. 7 and 8, a slab 38 has a body 40 identical to the slab body 22 of the first embodiment except that the slab body 40 has a much greater thickness. For example, the thickness of slab body 22 is preferably within the range of 1/16 to 2 inches, whereas the thickness of slab body 40 is preferably within the range of 2 to 10 inches (or greater) depending on fluid containment volume desired.

Also, similar to slab body 22 and its top surface 22A, the top surface 40A of the slab body 40 is porous, not being covered by a layer 42 which covers and is adhered to the bottom and side surfaces 40B, 40C of the slab body 40. However, the layer 42 covering the slab body 40 is composed of sealed and non-porous material (being the same as used on the slab body 22) which has greater thickness than that of the layer 24 in the first embodiment of the device used primarily in a drippage application. For example, the thickness of slab layer 24 is preferably within the range of 1/100 (film thickness) to ⅛ inch, whereas the thickness of slab layer 42 is preferably within the range of 1/32 to ½ inch. Because of the increased volume of fluid absorbed by the slab body 40, indentations 44 can be molded into the sealed, non-porous layer 42 at a pair of the opposite side surfaces 40C of the slab body 40 to provide fingerholds to facilitate lifting and carrying of the device. It should be readily apparent that, as in the case of the first embodiment of the device in FIG. 1, the device of the fifth embodiment can have any of a variety of configurations other than the rectangular configuration in FIG. 7.

The sixth embodiment of the device in the form of a slab 46 in FIG. 9 only differs from the slab 38 of the fifth embodiment of FIGS. 7 and 8 by the tapered or inclined configuration of the body 48 and layer 50 thereof. In particular, the slab body 48 has a top surface 48A larger in area than its bottom surface 48B. Thus, the side surfaces 48C of the slab body 48 are tapered or inclined outwardly and upwardly from the bottom surface 48B to the top surface 48A.

It should also be realized that in view of the preferred material composing the various slab bodies in the devices of the present invention, the slab bodies can be viewed as disposable in nature. Also, it should be understood that in view of the resiliently flexible nature of the slabs of devices of the present invention, they are essentially indestructable and crush-proof, meaning that a vehicle could accidentally run over them without destroying them for their intended purpose.

The absorptive, indestructable and crush-proof nature of the slab the devices makes it applicable as an fluid absorption and collection device in other applications. One such application is in a household as a bathroom mat for catching water dripping from a person's body or as a receptacle for catching fluid leaking from a broken pipe. In such applications as in others, the slab can have various sizes and shapes and can be in various colors.

It is thought that the improved fluid drippage absorption and collection devices of the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A fluid drippage absorption and collection device useful in automotive applications, comprising:

a floor-supportable slab having only a one-piece construction and being formed only of a generally block-like unitary body and a partial outer layer permanently adhered to said unitary body;

said unitary slab body being formed only by a porous, sponge-like, resiliently flexible, crush-proof, unsealed open-cell material capable of absorbing fluid drippage from an automobile, said material of said unitary slab body having a substantially solid interior bounded by a top surface, a bottom surface and an endless side surface extending between and interconnecting said top and bottom surfaces, said top and bottom surfaces extending in planes generally parallel to one another;

said slab layer being formed only by a non-porous, resiliently flexible, crush-proof, sealed open-cell material permanently and sealably adhered to said side and bottom surfaces of said material of said slab body such that only said top surface thereof remains unsealed and porous and thus capable of permitting entry of fluids into the interior of said material of said unitary slab body between said surfaces thereof;

said interior of said material of said unitary slab body bounded by said sealed bottom and endless side surfaces thereof constituting a solid, fluid absorbent receptacle for containing within said interior of said unitary slab body the fluids entering through said unsealed top surface thereof;

said resiliently flexible, crush-proof material of said slab body and layer rendering said slab compressible but indestructable in response to compressive forces applied thereto permitting said slab to rebound and recover to its original configuration after 2. The device as recited in claim 1, wherein said unsealed open-cell material is polyurethane foam.

3. The device as recited in claim 1, wherein said sealed open-cell material is polyurethane.

4. A fluid absorption and collection device useful in household applications, comprising:

a floor-supportable slab having only a one-piece construction and being formed only of a generally block-like unitary body and a partial outer layer permanently adhered to said unitary body;

said unitary slab body being formed by a porous, sponge-like, resiliently flexible, crush-proof, unsealed open-cell material capable of absorbing fluid drippage and leakage occurring in household applications, said material of said unitary slab body having a substantially solid interior bounded by a top surface, a bottom surface and an endless side surface extending between and interconnecting said top and bottom surfaces, said top and bottom surfaces extending in planes generally parallel to one another;

said slab layer being formed only by a non-porous, resiliently flexible, crush-proof, sealed open-cell material permanently and sealably adhered to said side and bottom surfaces of said material of said slab body such that only said top surface thereof remains unsealed and porous and thus capable of permitting entry of fluids into the interior of said material of said unitary slab body between said surfaces thereof;

said interior of said material of said unitary slab body bounded by said sealed bottom and endless side surfaces thereof constituting a solid, fluid absorbent receptacle for containing within said interior of said unitary slab body the fluids entering through said unsealed top surface thereof;

said resiliently flexible, crush-proof material of said slab body and layer rendering said slab compressible but indestructable in response to compressive forces applied thereto permitting said slab to rebound and recover to its original configuration after removal of such forces.

5. The device as recited in claim 4, wherein said unsealed open-cell material is polyurethane foam.

6. The device as recited in claim 4, wherein said sealed open-cell material is polyurethane.

7. A fluid drippage absorption and collection device, comprising:

a floor-supportable slab having only a one-piece construction and being formed only of a generally block-like unitary body and a partial outer layer permanently adhered to said unitary body;

said unitary slab body being formed only by a porous, sponge-like, resiliently flexible, crush-proof material capable of absorbing fluids, said material of said unitary slab body having a substantially solid interior bounded by a top surface, a bottom surface and an endless side surface extending between and interconnecting said top and bottom surfaces, said top and bottom surfaces extending in planes generally parallel to one another;

said slab layer being formed only by a non-porous, resiliently flexible, crush-proof material permanently and sealably adhered to said side and bottom surfaces of said material of said slab body such that only said top surface thereof remains unsealed and porous and thus capable of permitting entry of fluids into the interior of said material of said unitary slab body between said surfaces thereof;

said interior of said material of said unitary slab body bounded by said sealed bottom and endless side surfaces thereof constituting a solid, fluid absorbent receptacle for containing within said interior of said unitary slab body material the fluids entering through said unsealed top surface thereof;

said resiliently flexible, crush-proof material of said slab body and layer rendering said slab compressible but indestructable in response to compressive forces applied thereto permitting said slab to rebound and recover to its original configuration after removal of such forces.

8. The device as recited in claim 7, wherein said slab body is composed of an unsealed open-cell material.

9. The device as recited in claim 8, wherein said open-cell material is polyurethane foam.

10. The device as recited in claim 7, wherein said slab layer is composed of a sealed open-cell material.

11. The device as recited in claim 10, wherein said open-cell material is polyurethane.

12. The device as recited in claim 7, wherein said slab has a rectangular configuration.

13. The device as recited in claim 7, wherein said slab has a circular configuration.

14. The device as recited in claim 7, wherein said slab has an oblong configuration.

15. The device as recited in claim 7, wherein said bottom surface of said slab body material is larger in area than said top surface thereof such that said side surface inclines outwardly and downwardly from said top to said bottom surface.

16. The device as recited in claim 7, wherein said slab has means located along opposite portions of said side surface of said slab body for facilitating lifting of said slab.

17. The device as recited in claim 16, where said means is a pair of fingerhold indentations formed in said slab layer at said opposite portions of said body side surface.

18. The device as recited in claim 7, wherein said body and said partial outer layer of said slab are molded together to provide said one-piece construction.

* * * * *

UNITED STATES PATENT AND TRADEMARK OFFICE
CERTIFICATE OF CORRECTION

PATENT NO.  : 4,826,030

DATED       : May 2, 1989

INVENTOR(S) : Charles R. Valley

It is certified that error appears in the above-identified patent and that said Letters Patent is hereby corrected as shown below:

Column 5, line 68 (Claim 1, line 37), following "after" insert -- removal of such forces. --.

Signed and Sealed this

Sixth Day of November, 1990

Attest:

HARRY F. MANBECK, JR.

Attesting Officer

Commissioner of Patents and Trademarks